US012063425B2

(12) United States Patent
DiVirgilio et al.

(10) Patent No.: US 12,063,425 B2
(45) Date of Patent: Aug. 13, 2024

(54) INTERCHANGEABLE CONNECTOR PANEL SYSTEM FOR FIXED MOUNT INDUSTRIAL SCANNERS

(71) Applicant: ZEBRA TECHNOLOGIES CORPORATION, Lincolnshire, IL (US)

(72) Inventors: Joseph J. DiVirgilio, Port Jefferson Station, NY (US); Eric Trongone, Coram, NY (US); Qing Tu, Stony Brook, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 413 days.

(21) Appl. No.: 17/162,716

(22) Filed: Jan. 29, 2021

(65) Prior Publication Data
US 2022/0247896 A1 Aug. 4, 2022

(51) Int. Cl.
*H04N 23/54* (2023.01)
*G06F 13/20* (2006.01)
*G06T 7/00* (2017.01)
*H04N 23/51* (2023.01)
*H04N 23/52* (2023.01)

(52) U.S. Cl.
CPC ............. *H04N 23/54* (2023.01); *G06F 13/20* (2013.01); *G06T 7/0008* (2013.01); *H04N 23/51* (2023.01); *H04N 23/52* (2023.01)

(58) Field of Classification Search
CPC ........ H04N 23/54; H04N 23/51; H04N 23/52; G06F 13/20; G06T 7/0008

USPC ........................................................ 348/92
See application file for complete search history.

(56) References Cited

U.S. PATENT DOCUMENTS

| | | | |
|---|---|---|---|
| 5,758,200 A * | 5/1998 | Inoue ..................... | G03B 17/08 396/25 |
| 7,259,686 B2 * | 8/2007 | Hollander .............. | G01K 7/023 374/171 |
| 8,267,726 B1 * | 9/2012 | Love, II .................. | H04Q 1/09 439/668 |
| 8,781,312 B1 * | 7/2014 | Desouza, Jr. .......... | G03B 17/08 396/27 |

(Continued)

*Primary Examiner* — Matthew David Kim

(57) ABSTRACT

Interchangeable connector panel systems for fixed mount industrial scanners are disclosed herein. An example interchangeable connector panel system for fixed mount industrial scanners includes a housing including a mounting mechanism and a coupling mechanism, an image capture assembly at least partially disposed within the housing, and a first field-interchangeable removable connector module. The image capture assembly includes an optical assembly, a decoder engine, at least one image capture assembly interface, and at least one of a central processing unit or a graphics processing unit. The first field-interchangeable removable connector module couples with the coupling mechanism of the housing and is removable by a user in-field. The first removable connector module includes at least one connector module interface and an input/output (I/O) interface having a first configuration. The at least one image capture assembly interface communicatively couples with the at least one connector module interface to allow transmission between the I/O interface and the image capture assembly.

27 Claims, 7 Drawing Sheets

(56) References Cited

U.S. PATENT DOCUMENTS

| | | | |
|---|---|---|---|
| 2005/0174467 A1* | 8/2005 | Kawai | H04N 23/55 |
| | | | 348/335 |
| 2005/0264656 A1* | 12/2005 | Seo | H04N 23/52 |
| | | | 348/E5.046 |
| 2008/0100718 A1* | 5/2008 | Louks | H04N 1/00519 |
| | | | 348/E5.024 |
| 2014/0268452 A1* | 9/2014 | Khoury | G05D 23/32 |
| | | | 361/56 |
| 2015/0098686 A1* | 4/2015 | Obukhov | H04N 5/77 |
| | | | 386/226 |
| 2015/0273184 A1* | 10/2015 | Scott | H01B 7/04 |
| | | | 29/842 |
| 2016/0026838 A1* | 1/2016 | Gillet | G06K 7/10732 |
| | | | 235/462.21 |
| 2017/0064435 A1* | 3/2017 | Jetter | H04R 1/1008 |
| 2018/0035489 A1* | 2/2018 | Spalding, Jr. | H05B 3/06 |
| 2019/0028617 A1* | 1/2019 | Odom | G06T 1/20 |
| 2019/0227410 A1* | 7/2019 | Yang | G03B 17/12 |
| 2020/0154055 A1* | 5/2020 | Schieltz | G03B 17/561 |
| 2021/0234994 A1* | 7/2021 | Sebree | G03B 17/55 |

* cited by examiner

INTERCHANGEABLE CONNECTOR PANEL SYSTEM FOR FIXED MOUNT INDUSTRIAL SCANNERS

BACKGROUND

Fixed-mount industrial scanners and/or barcode readers may be used in warehouse environments and/or other similar settings. These scanners may be used to scan barcodes and inspect parts in an assembly line. Oftentimes, these scanners have varying input/output ("I/O") interfaces to connect with different systems and/or components. Typically, these scanners may include intermediary parts between these I/O interfaces and the remainder of the assembly that do not allow the I/O interfaces to be easily accessible and instead require substantial disassembly of the device to access the connector components if service is needed. Accordingly, it may be difficult or impossible to change these components in the field, and instead may require the assembly line to be taken down for extended periods. Additionally, optical components in these scanners may be subject to dust and/or fingerprints during the disassembly process, which may lead to poor device performance.

Accordingly, there is a need for improved accessories having improved functionalities.

SUMMARY

In accordance with a first aspect, a fixed mount industrial scanner having an interchangeable connector panel system includes a housing including a mounting mechanism and a coupling mechanism, an image capture assembly at least partially disposed within the housing, and a first field-interchangeable removable connector module. The image capture assembly includes an optical assembly, a decoder engine, at least one image capture assembly interface, and at least one of a central processing unit or a graphics processing unit. The first field-interchangeable removable connector module couples with the coupling mechanism of the housing and is removable by a user in-field. The first removable connector module includes at least one connector module interface and an input/output (I/O) interface having a first configuration. The at least one image capture assembly interface communicatively couples with the at least one connector module interface to allow transmission between the I/O interface and the image capture assembly.

In a variation of this embodiment, the I/O interface may include at least one of a power transmission interface, a data transmission interface, or a combined power and data transmission interface.

In some examples, the scanner may include a second removable connector module adapted to communicatively couple with the coupling mechanism of the housing. The second removable connector module including an I/O interface having a second configuration that is different from the I/O interface of the first removable connector module.

In some approaches, the at least one image capture assembly interface communicatively couples with the at least one connector module interface via a flex tail interconnection. Further, in these and other approaches, the at least one image capture assembly interface communicatively couples with the at least one connector module interface via a board to board interconnection. Further still, in other approaches, the at least one image capture assembly interface communicatively couples with the at least one connector module interface via a contact pad interconnection.

In some examples, the at least one image capture assembly interface communicatively couples with the at least one connector module interface via a wireless communication interface. The first field-interchangeable removable connector module may communicatively couple with a host system via a wireless communication interface.

In some forms, the first removable connector module couples with the coupling mechanism of the housing via at least one of a friction fit engagement, a snap-in engagement, a magnetic engagement, or a fastener engagement.

In some examples, the scanner may include a seal member adapted to surround at least a portion of the image capture assembly to limit ingress of at least one of objects, particulates, dust, or liquid into the image capture assembly.

In some examples, the first field-interchangeable removable connector module may be decoupled from the coupling mechanism of the housing without disassembly of any portion of the fixed mount industrial scanner not associated with the first field-interchangeable removable connector module. In some examples, the at least one connector module interface is the only interface between the I/O interface and the image capture assembly. Further, in some examples, the first field-interchangeable removable connector module includes a connector for a data storage medium in the form of at least one of a USB thumb drive, or a SD card.

In accordance with a second aspect, a field-interchangeable fixed mount industrial scanner configured to be fixedly mounted in a manufacturing assembly includes a housing including mounting and coupling mechanisms, an image capture assembly at least partially disposed within the housing, and a first removable connector module. The image capture assembly includes an optical assembly, at least one image capture assembly interface, and a tangible machine-readable medium comprising instructions that, when executed, cause the image capture assembly to capture at least one image of an object and determine a presence or lack of a specified feature associated with the object. The first removable connector module is adapted to couple with the coupling mechanism of the housing and includes at least one connector module interface and an input/output (I/O) interface having a first configuration. The optical assembly is hermetically enclosed within the housing and the at least one image capture assembly interface is adapted to communicatively couple with the at least one connector module interface to allow transmission between the I/O interface and the image capture assembly.

In accordance with a third aspect, a field-interchangeable fixed mount industrial scanner configured to be fixedly mounted in a manufacturing assembly includes a housing carrying an image capture assembly and includes a mounting mechanism and a coupling mechanism. The coupling mechanism removably receives at least one of a first removable connector module including at least one connector module interface and an input/output (I/O) interface having a first configuration or a second removable connector module including an I/O interface having a second configuration that is different from the I/O interface of the first removable connector module. The image capture assembly is disposed in a substantially enclosed compartment of the housing removed from the coupling mechanism.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
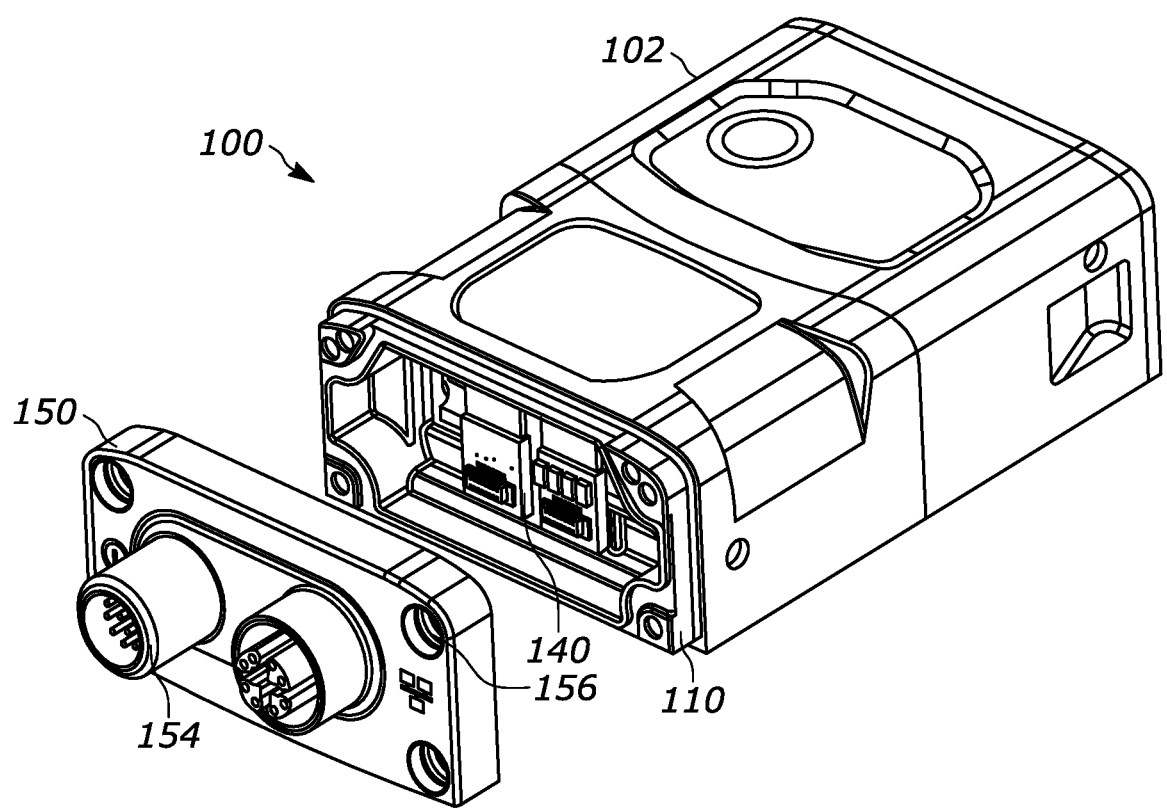
FIG. 1 illustrates a perspective view of an example fixed mount industrial scanner in accordance with various embodiments.
Figure 2:
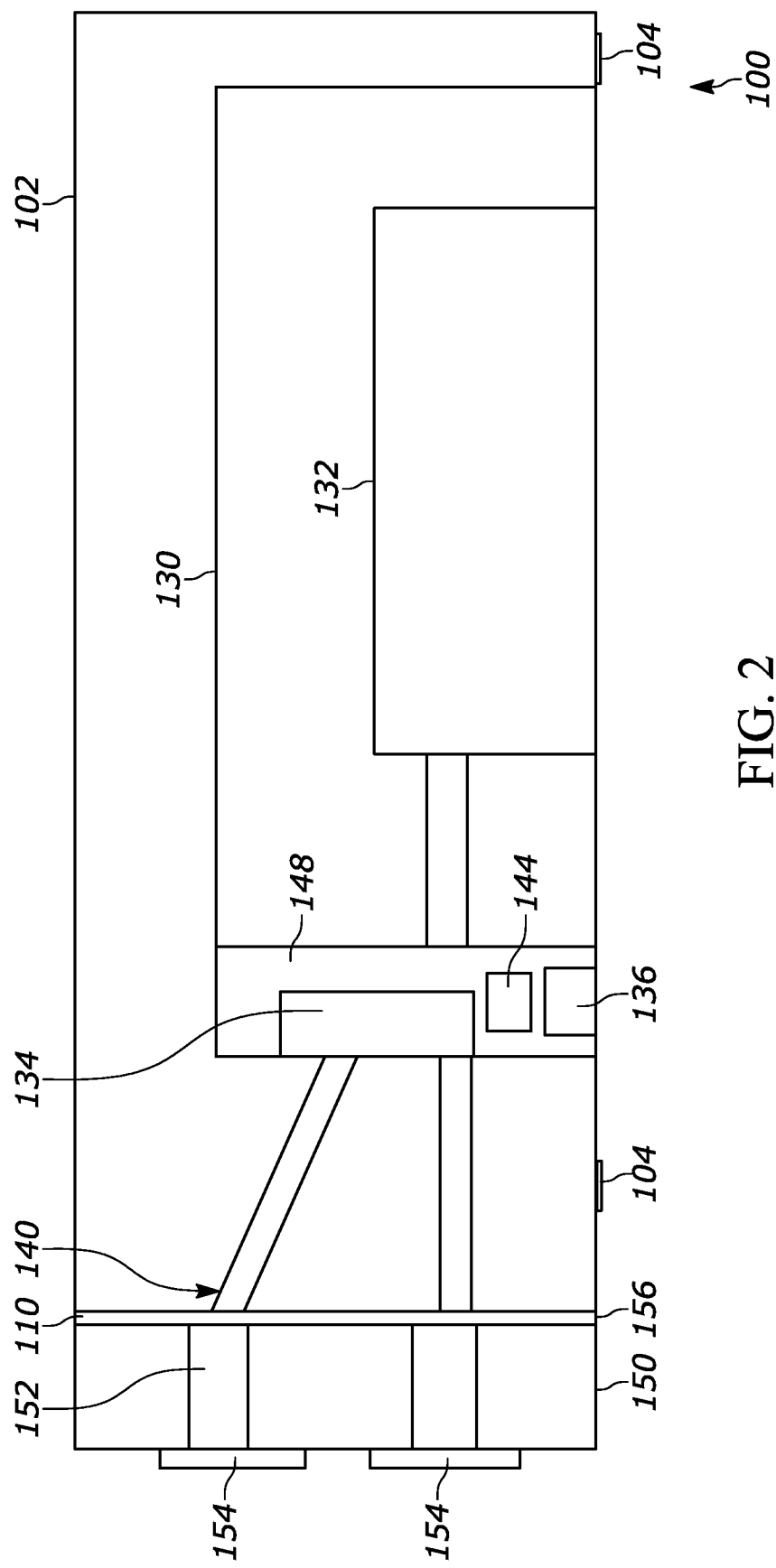
FIG. 2 illustrates a schematic of the example fixed mount industrial scanner of FIG. 1 in accordance with various embodiments.
Figure 3:
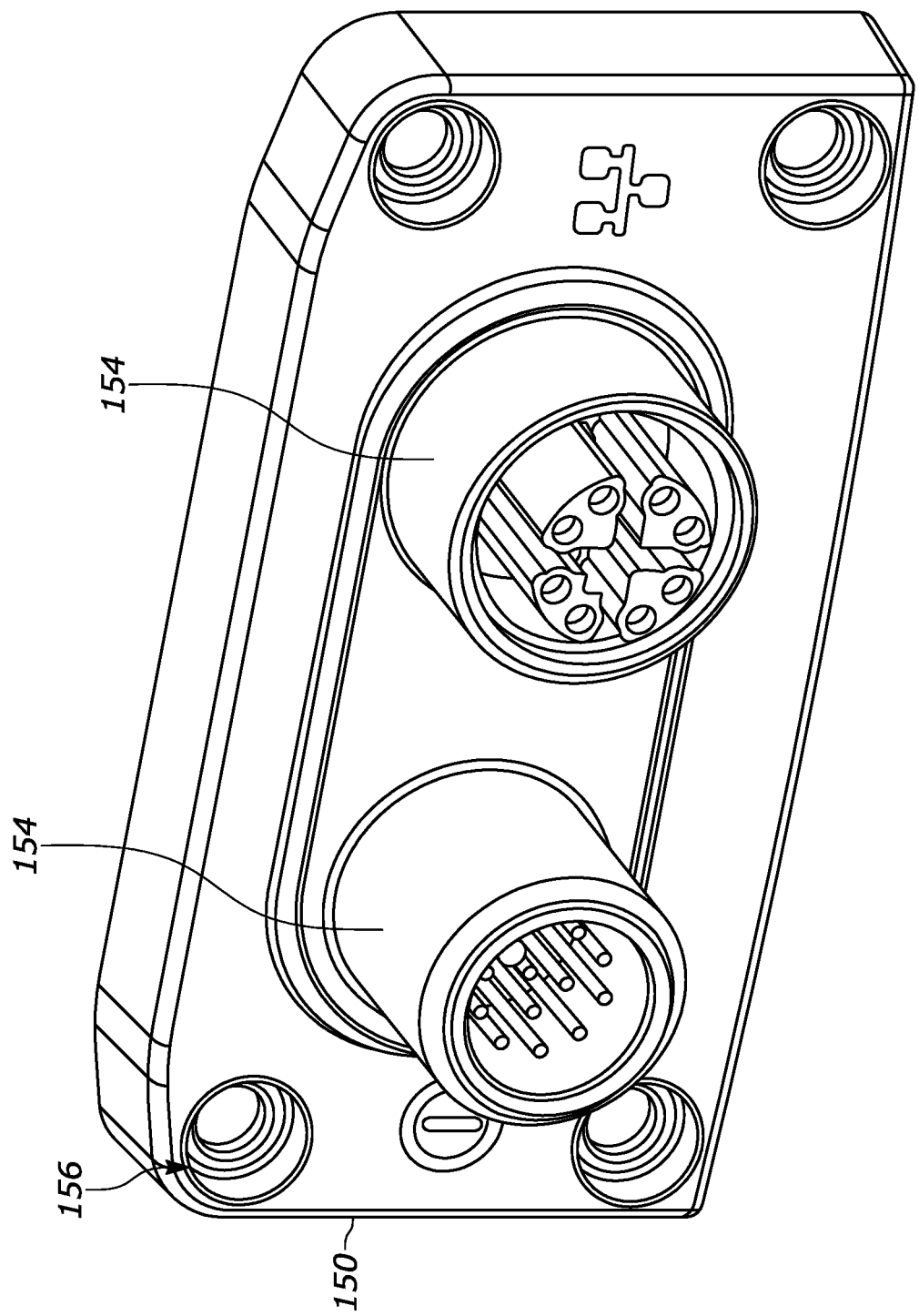
FIG. 3 illustrates a front perspective view of a first example field-interchangeable removable connector module for use with the example fixed mount industrial scanner of FIGS. 1 & 2 in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, an interchangeable connector panel system for a fixed mount industrial scanner is provided. The interchangeable connector panel system may be interchangeable by a user in the field, meaning the scanner needn't be removed from its mounting structure in its warehouse or assembly line environment. These scanners may be equipped with machine vision capabilities to perform real-time inspection while parts and/or components travel along assembly lines, and may be capable of identifying and/or resolving issues on the assembly line.

Turning to FIGS. 1-5, a fixed mount industrial scanner 100 is provided that includes a housing 102 having any number of mounting mechanisms 104 and a coupling mechanism 110, an image capture assembly 130 at least partially disposed within the housing 102, and a first field-interchangeable removable connector module 150 that couples with the coupling mechanism 110 of the housing 102. The housing 102 includes an open portion or volume that is dimensioned to accommodate any number of components, subcomponents, systems, and/or subsystems of the scanner to capture images of a desired object 14 (FIG. 9) disposed in an environment 10. The fixed mount industrial scanner 100 may additionally include any number of additional components or any other circuitry and circuit boards to assist in operation of the scanner 100.

Figure 9:
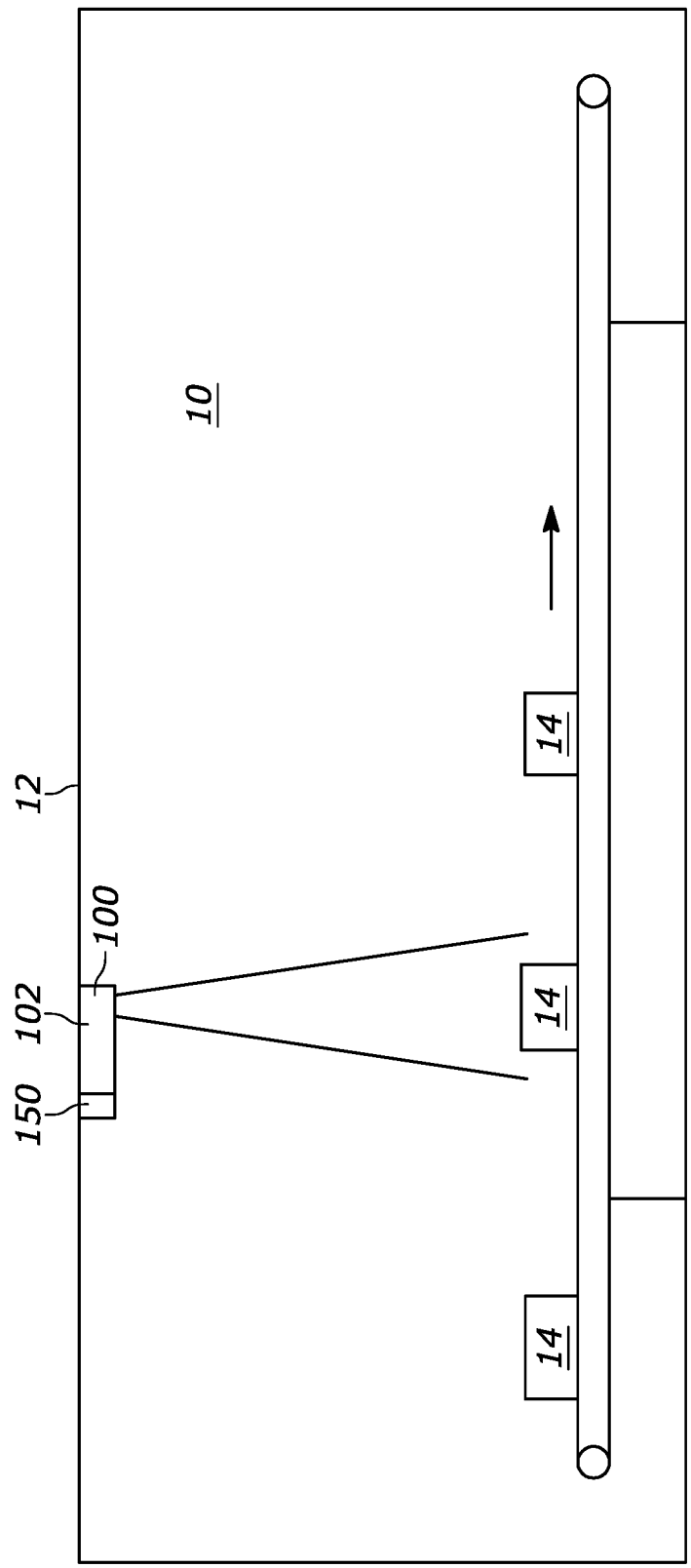
FIG. 9 illustrates an example schematic of the fixed mount industrial scanner of FIGS. 1-8 provided in an example use environment in accordance with various embodiments.

With brief reference to FIG. 9, the housing 102 may be fixedly coupled with a frame member or other structure 12 provided in an environment 10 such as, for example, an assembly line and/or manufacturing facility via the mounting mechanisms 104. In some examples, the mounting mechanisms 104 may be in the form of threaded openings to receive a bolt or screw. Other examples are possible such as, for example, a magnetic coupling.

The image capture assembly 130 includes an optical assembly 132 having elements for imaging the target object 14 onto an image sensor of the image capture assembly 130. The image capture assembly 130 further includes a tangible machine-readable medium 134, a decoder engine 136, at least one image capture assembly interface 140, and at least one central processing unit or graphics processing unit 144. In embodiments, the image capture assembly 130, specifically the optical assembly 132, may include one or more aspheric lenses, glass lenses, variable focus lenses, spatial filters, optical filters, apertures, bandpass filters, highpass filters, lowpass filters, notch filters, chromatic filters, neutral density filters, or another type of lens or optical element. In embodiments, the image capture assembly 130 may be configured to correct or mitigate chromatic dispersion, optical field curvature, coma, chromatic aberrations, and/or other optical field distortions. In any embodiments, the image capture assembly 130 is configured to allow for the image of the target object 14 to form correctly on the imaging sensor. Other configurations and/or components may be used.

As previously noted, the image capture assembly 130 may further include an imaging sensor (not illustrated) and a sensor circuit board 148. The imaging sensor is configured to receive an image of the target object 14 and to generate an electrical signal indicative of the image of the target object 14. The sensor circuit board 148 is communicatively coupled with the imaging sensor to control the imaging sensor for obtaining an image of the target object 14. Further, the decoder engine 136, the image capture assembly interface 140, and the central processing unit or graphics processing unit 144 may each be operably or communicatively coupled with the sensor circuit board 148. The sensor circuit board 148 may include additional components such as a controller for controlling when to activate the imaging sensor to capture the image (i.e., an image frame) of the target object 14 as well as one or more memories for storing the electrical signal indicative of the captured image, or for storing computer readable instructions for controlling the imaging sensor. The fixed mount industrial scanner 100 has an imaging field of view (FOV) for capturing image frames of the target object 14.

The image capture assembly 130 may be capable of performing machine vision analyses. Generally speaking, the tangible machine-readable medium 134 includes instructions that, when executed, cause the image capture assembly 130 to capture at least one image of the target object 14 to determine the presence and/or absence of a specified feature associated with the target object 14 and/or to determine positional accuracy of the target object 14 or features thereon. The image capture assembly 130 may use the central processing unit or graphical processing unit 144 to analyze the images and make appropriate decisions based thereon. For example, if a faulty target object 14 traverses an assembly line and enters the FOV of the scanner 100, the scanner 100 may determine the target object 14 is faulty and may generate a trigger to alert a user to further assess the target object 14. In other examples, the scanner 100 may be capable of automatically flagging the target object 14 for disposal or other processes. Other examples of suitable features are possible.

The image capture assembly interface 140 may include a communications module or input/output (I/O) devices and ports for communicating with external systems, devices, and networks, and may be communicatively and/or operably coupled with the sensor circuit board 148 to allow for power and/or data transmission between the image capture assembly 130, the remainder of the scanner 100, and any external systems and/or subsystems such as, for example, displays, computing devices, and the like. In the illustrated examples of FIGS. 1, 5, and 8, the image capture assembly interface 140 is in the form of a number of flex tail connectors, though any type of suitable connector may be used such as, for example, board to board connectors, sockets, conductive pads positioned on the sensor circuit board 148, and the like. Other examples are possible.

The coupling mechanism 110 is positioned at an end of the housing 102 and is dimensioned to operably couple with the first field-interchangeable removable connector module 150 (and/or any additional field-interchangeable removable connector modules). In some examples, the coupling mechanism 110 may be in the form of a ledge, a protrusion, or a groove, and in other examples, the coupling mechanism 110 may additionally include notches, snaps, tabs, slots, and/or threaded openings to receive a fastener or fasteners.

Figure 4:
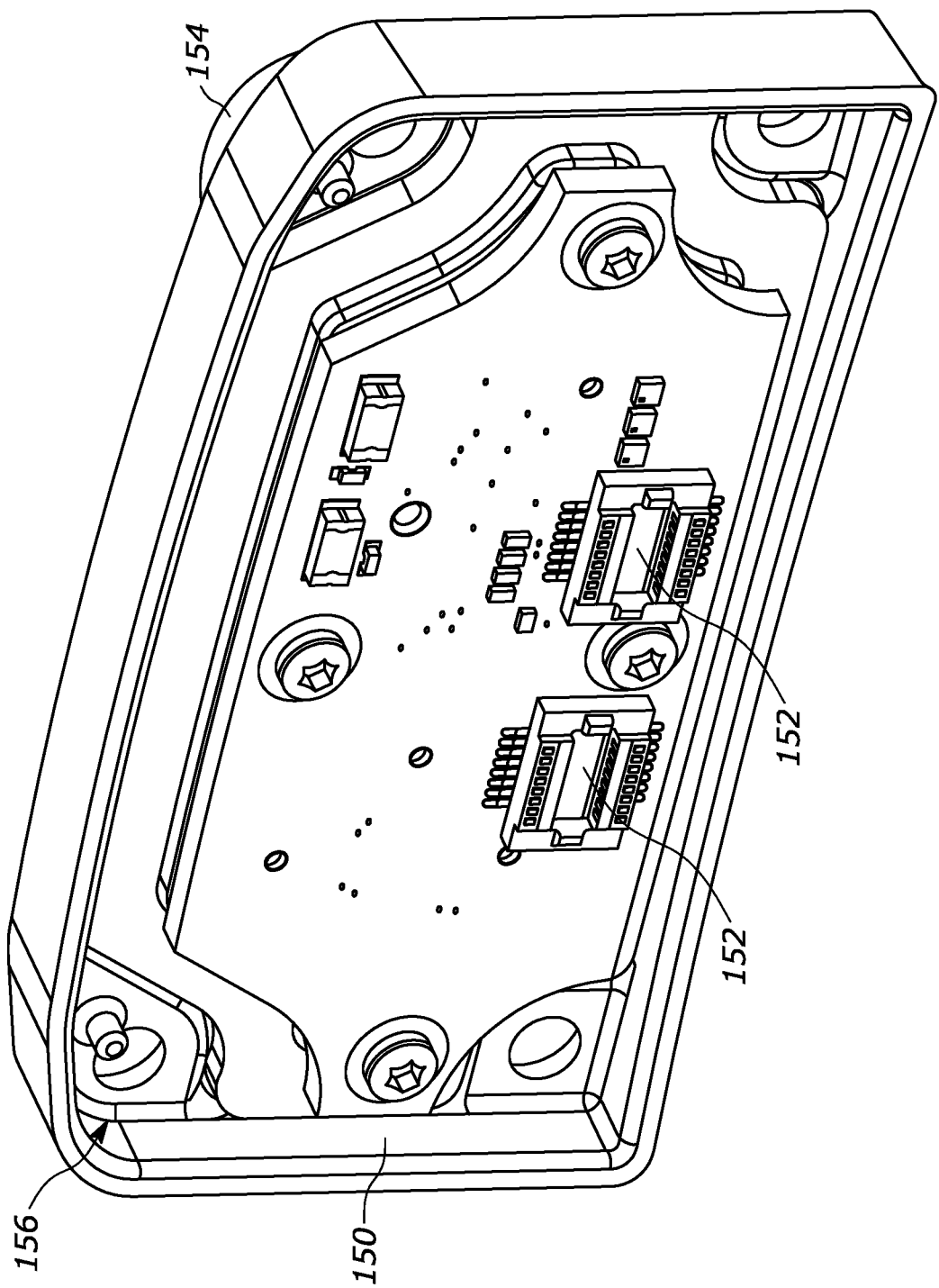
FIG. 4 illustrates a rear perspective view of the first example field-interchangeable removable connector module of FIG. 3 in accordance with various embodiments.
Figure 5:
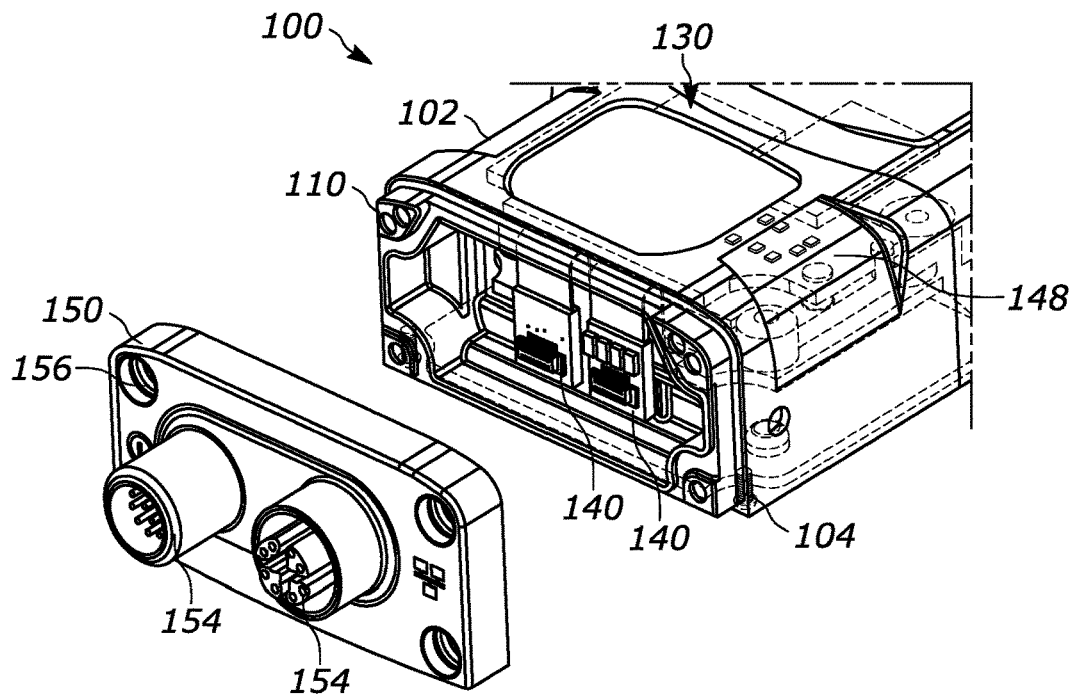
FIG. 5 illustrates a close-up perspective view of the example fixed mount industrial scanner of FIGS. 1-4 including a flex tails interconnection in accordance with various embodiments.

The first field-interchangeable removable connector module 150 includes a connector module interface 152, an I/O interface 154 having a first configuration, and a module coupling mechanism 156. Generally speaking, the connector module interface 152 and the module coupling mechanism 156 correspond to the respective image capture assembly interface 140 and coupling mechanism 110 of the housing 102. The first field-interchangeable removable connector module 150 includes an I/O interface in the form of two M12 connectors which may be used for power and/or data transmission between an external device and the scanner 100. In this example, and as illustrated in FIG. 4, the connector module interface 152 is in the form of two corresponding connectors adapted to couple with the image capture assembly interface 140 via a press-fit connection. In other examples, the connector module interface 152 may be in other forms which correspond to the image capture assembly interface 140 to allow data and/or electrical transmission therebetween. For example, while flex tail connectors are illustrated in the Figures, other suitable arrangements for the image capture assembly interface 140 and the corresponding connector module interface 152 may include board to board connectors, socket and plug arrangements, leaf spring contacts, pogo pin connections, and the like. In other examples, each of the image capture assembly interface 140 and the connector module interface 152 may be in the form of wireless communication devices that communicate with and transmit data therebetween using any number of suitable wireless communication protocols. Other examples are possible. So configured, the connector module interface 152 communicatively couples with the image capture assembly interface 140 to allow transmission between the I/O interface 154 (and the external components coupled therewith) and the image capture assembly 130.

The module coupling mechanism 156 is used to secure the first field-interchangeable removable connector module 150 with the housing 102 and as such, is provided in the form of a corresponding mating arrangement. More specifically, in the illustrated examples, the module coupling mechanism 156 is in the form of a corresponding ledge that mates with a protrusion extending about a perimeter of the housing 102. Further, the module coupling mechanism 156 includes a number of throughbores 156a which align with the threaded openings positioned on the housing 102 to receive a screw, bolt, or other fastener. In other examples, the module coupling mechanism 156 may couple with the coupling mechanism 110 of the housing via any number of suitable approaches such as, for example, a friction-fit connection, a tabbed arrangement, magnets, and the like.

The module coupling mechanism 156 of the first field-interchangeable removable connector module 150 allows a user to quickly remove the first field-interchangeable removable connector module 150 in-field without needing to detach the scanner 100 from the structure 12 to which it is mounted in the environment 10. Accordingly, in the event that servicing or maintenance is needed to the removable connector module 150, the user needn't entirely disassemble the scanner 100 and thus may save time completing necessary repairs to the module 150 by simply replacing the removable connector module 150 with a replacement module as needed.

Figure 6:
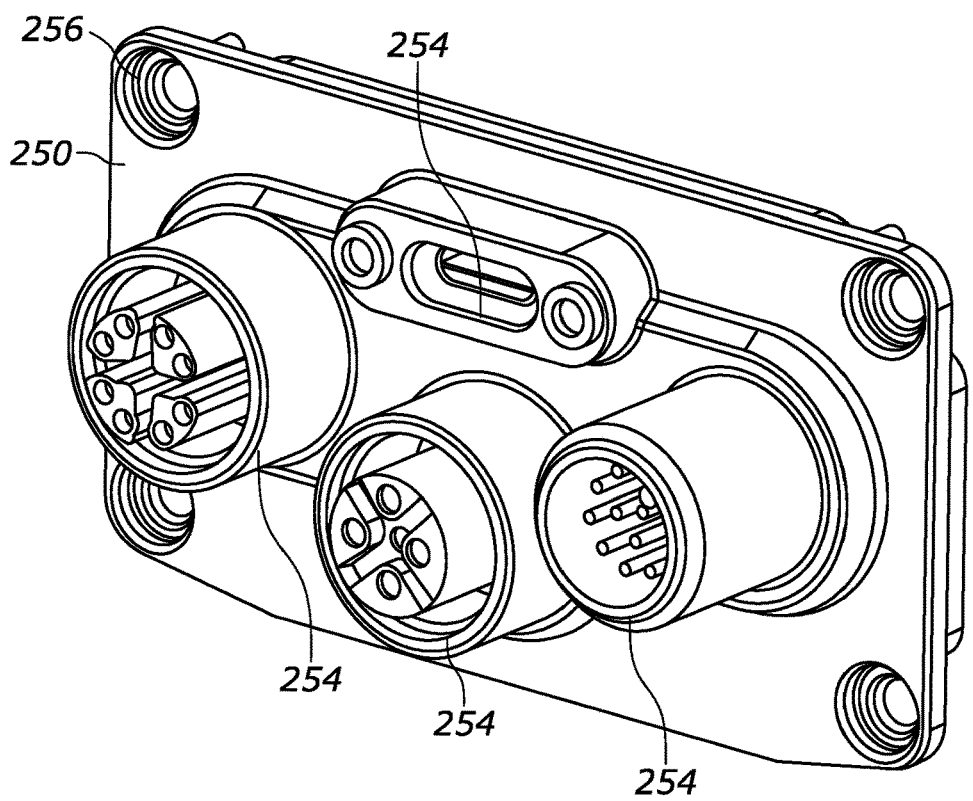
FIG. 6 illustrates a front perspective view of a second example field-interchangeable removable connector module for use with the example fixed mount industrial scanner of FIG. 1 in accordance with various embodiments.
Figure 7:
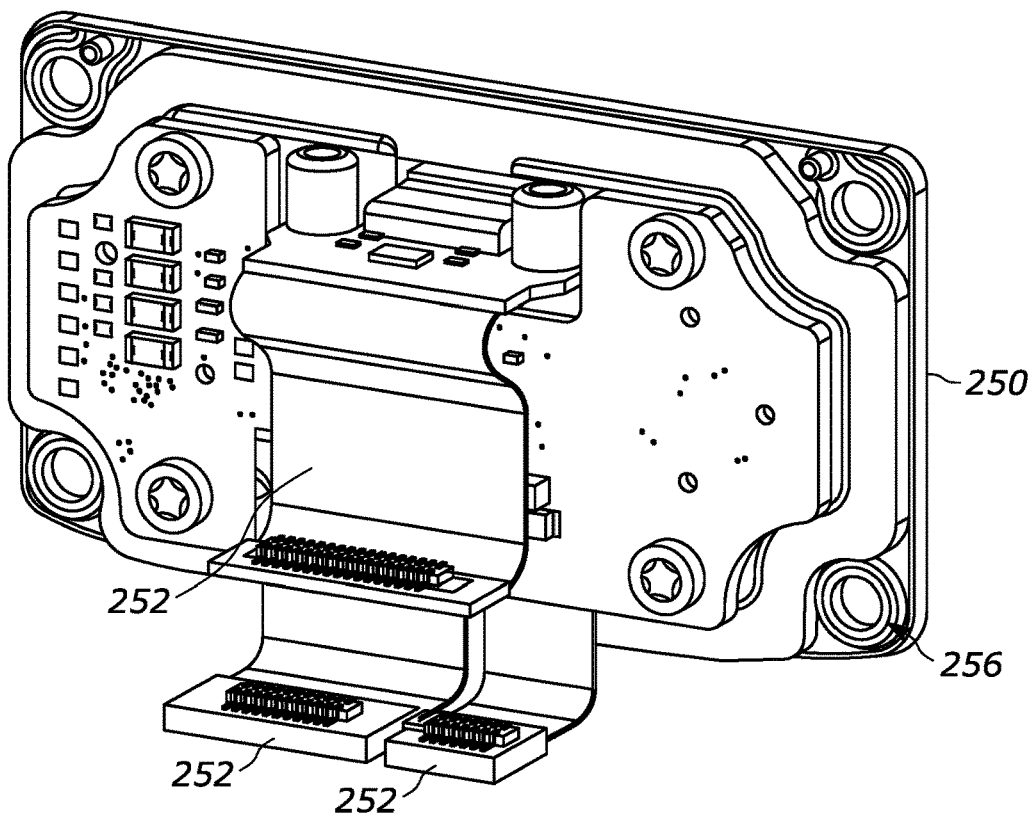
FIG. 7 illustrates a rear perspective view of the second example field-interchangeable removable connector module of FIG. 6 in accordance with various embodiments.
Figure 8:
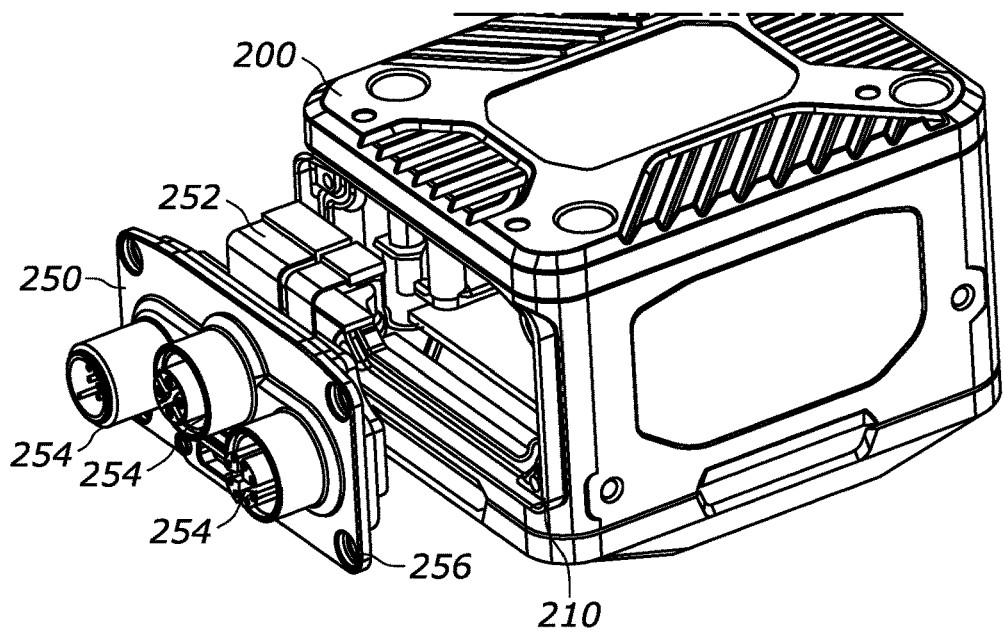
FIG. 8 illustrates a perspective view of a second example fixed mount industrial scanner and the second example field-interchangeable removable connector module of FIGS. 6 and 7 in accordance with various embodiments.

Further, with reference to FIGS. 6-8, an alternative field-interchangeable removable connector module 250 is provided which may be used with an alternative scanner 200. The second field-interchangeable removable connector module 250 includes similar features as the first field-interchangeable removable connector module 150, and as such, similar components are provided with reference numerals having identical two-digit suffixes. In this example, the I/O interface 254 is provided in a different arrangement or configuration to accommodate different power, data, and/or combined power and data couplings with external devices. The module coupling mechanism 256 couples with the coupling mechanism 110 in a similar manner as the module coupling mechanism 156 of the first field-interchangeable removable connector module 150. Similarly, the connector module interface 252 couples with the image capture assembly interface 140 in a similar manner as the connector module interface 152 of the first field-interchangeable removable connector module 150. A user may selectively use a desired module 150, 250 in the environment 10 depending on the particular configuration necessary to couple the scanner 100 with external devices. Further, any number of additional modules may be provided that include I/O interfaces having different port configurations (e.g., one M12 connector, four M12 connectors, eight M12 connectors, a USB connector, external illumination connectors, and/or an Ethernet connector, etc.).

In some examples, the scanner 100 may be equipped with additional wireless communication interfaces. More specifically, an example field-interchangeable removable connector module (not illustrated) may include an I/O interface having a wireless transmitter used to replace the above-mentioned connectors. This transmitter may communicate with external environmental components in a similar manner as the wired I/O interfaces, but may advantageously reduce a need for running cabling to the scanner 100. For example, if a user were attempting to resolve an issue on an assembly line responsible for producing faulty parts, it may be time consuming to run and/or secure cabling to a location where a scanner 100 is desired to be added to the system to perform machine vision-based inspections. In such an example, a user may simply mount a scanner 100 in a desired location, couple the wireless I/O interface of the field-interchangeable removable connector module with a corresponding computing device, display, etc., and begin using the scanner 100 to observe target objects to identify potential issues. In some examples, the module may be equipped with a SD card slot to receive a memory card capable of enabling the desired scanner function. It is appreciated that such a wireless I/O interface may be used to replace the wired I/O interface under normal operating conditions as desired. In any of these examples, the removable connector module may include a battery or other power unit to supply power to the scanner 100.

In some examples, all or a portion of the image capture assembly 130 (e.g., the optical assembly 132) may be provided in a substantially enclosed compartment of the housing 102, and may thus be at a location that is positioned away or removed from coupling mechanism 110. Such an arrangement may include a sealing member, such as a hermetic seal, to hermetically enclose the desired components. Such an arrangement may advantageously reduce the ingress of foreign objects such as dust, dirt, and or fluids from damaging or otherwise degrading performance of the image capture assembly 130. Any number of suitable sealing members, filter, and the like may be used to seal the desired components from the external environment.

So configured, the scanner 100 described herein may be used with different interfaces as needed to reduce a number of distinct scanner SKUs in the environment. Such a configuration eliminates the need to disassemble the entire scanner, thereby avoiding problems such as incorrect reassembly, loose connections, and/or contamination. Further, a replacement interface of the same type may be quickly coupled with the scanner 100 to perform repairs or service to the module as needed. The scanners 100 described herein may quickly be converted to wireless units to assist with time-sensitive diagnoses, and may ensure the optical assembly remains free of foreign debris.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A fixed mount industrial scanner, comprising:
a housing including a first compartment, a second compartment, a mounting mechanism, and a coupling mechanism, wherein the coupling mechanism is within the second compartment and the first compartment is hermetically sealed from the environment external to the assembly and from the second compartment;
an image capture assembly hermetically sealed within the first compartment of the housing, the image capture assembly including an optical assembly, a decoder engine, at least one image capture assembly interface, and at least one of a central processing unit or a graphics processing unit; and
a first field-interchangeable removable connector module adapted to couple with the coupling mechanism of the housing and be removable by a user in-field, the first removable connector module including at least one connector module interface and an input/output (I/O) interface having a first configuration, wherein the first removeable connector module forms a wall of the second compartment;
wherein the at least one image capture assembly interface is adapted to communicatively couple with the at least one connector module interface to allow transmission between the I/O interface and the image capture assembly, and wherein the first removable connector module is removable from the assembly such that when the first removable connector module is removed from the second compartment, the hermetic sealing of the first compartment is not disturbed.

2. The fixed mount industrial scanner of claim 1, wherein the I/O interface comprises at least one of a power transmission interface, a data transmission interface, or a combined power and data transmission interface.

3. The fixed mount industrial scanner of claim 1, further comprising a second removable connector module adapted to communicatively couple with the coupling mechanism of the housing, the second removable connector module including an I/O interface having a second configuration that is different from the I/O interface of the first removable connector module.

4. The fixed mount industrial scanner of claim 1, wherein the at least one image capture assembly interface communicatively couples with the at least one connector module interface via a flex tail interconnection.

5. The fixed mount industrial scanner of claim 1, wherein the at least one image capture assembly interface communicatively couples with the at least one connector module interface via a board to board interconnection.

6. The fixed mount industrial scanner of claim 1, wherein the at least one image capture assembly interface communicatively couples with the at least one connector module interface via a contact pad interconnection.

7. The fixed mount industrial scanner of claim 1, wherein the at least one image capture assembly interface communicatively couples with the at least one connector module interface via a wireless communication interface.

8. The fixed mount industrial scanner of claim 1, wherein the first field-interchangeable removable connector module communicatively couples with a host system via a wireless communication interface.

9. The fixed mount industrial scanner of claim 1, wherein the first removable connector module couples with the coupling mechanism of the housing via at least one of a friction fit engagement, a snap-in engagement, a magnetic engagement, or a fastener engagement.

10. The fixed mount industrial scanner of claim 1, further comprising a seal member adapted to surround at least a portion of the image capture assembly to limit ingress of at least one of objects, particulates, dust, or liquid into the image capture assembly.

11. The fixed mount industrial scanner of claim 1, wherein the first field-interchangeable removable connector module may be decoupled from the coupling mechanism of the housing without disassembly of any portion of the fixed mount industrial scanner not associated with the first field-interchangeable removable connector module.

12. The fixed mount industrial scanner of claim 1, wherein the at least one connector module interface is the only interface between the I/O interface and the image capture assembly.

13. The fixed mount industrial scanner of claim 1, wherein the first field-interchangeable removable connector module includes a connector for a data storage medium, the data storage medium comprising at least one of a USB thumb drive, or a SD card.

14. A field-interchangeable fixed mount industrial scanner configured to be fixedly mounted in a manufacturing assembly, the field-interchangeable fixed mount industrial scanner comprising:
a housing including a first compartment, a second compartment, a mounting mechanism and a coupling mechanism, wherein the coupling mechanism is within the second compartment and the first compartment is hermetically sealed from the environment external to the assembly and from the second compartment;

an image capture assembly hermetically sealed within the first compartment of the housing, the image capture assembly including an optical assembly, at least one image capture assembly interface, and a tangible machine-readable medium comprising instructions that, when executed, cause the image capture assembly to capture at least one image of an object and determine a presence or lack of a specified feature associated with the object; and a first removable connector module adapted to couple with the coupling mechanism of the housing, the first removable connector module including at least one connector module interface and an input/output (I/O) interface having a first configuration, wherein the first removeable connector module forms a wall of the second compartment;

wherein the at least one image capture assembly interface is adapted to communicatively couple with the at least one connector module interface to allow transmission between the I/O interface and the image capture assembly, and wherein the first removable connector module is removeable from the assembly such that when the first removeable connector module is removed from the second compartment, the hermetic sealing of the first compartment is not disturbed.

15. The field-interchangeable fixed mount industrial scanner of claim 14, wherein the I/O interface comprises at least one of a power transmission interface, a data transmission interface, or a combined power and data transmission interface.

16. The field-interchangeable fixed mount industrial scanner of claim 14, further comprising a second removable connector module adapted to communicatively couple with the coupling mechanism of the housing, the second removable connector module including an I/O interface having a second configuration that is different from the I/O interface of the first removable connector module.

17. The field-interchangeable fixed mount industrial scanner of claim 14, wherein the at least one image capture assembly interface communicatively couples with the at least one connector module interface via a wireless communication interface.

18. The field-interchangeable fixed mount industrial scanner of claim 14, wherein the first removable connector module communicatively couples with a host system via a wireless communication interface.

19. The field-interchangeable fixed mount industrial scanner of claim 14, wherein the first removable connector module couples with the coupling mechanism of the housing via at least one of a friction fit engagement, a snap-in engagement, a magnetic engagement, or a fastener engagement.

20. The field-interchangeable fixed mount industrial scanner of claim 14, further comprising a seal member adapted to surround at least a portion of the image capture assembly to limit ingress of at least one of objects, particulates, dust, or liquid into the image capture assembly.

21. The field-interchangeable fixed mount industrial scanner of claim 14, wherein the first removable connector module may be decoupled from the coupling mechanism of the housing without disassembly of any portion of the fixed mount industrial scanner not associated with the first removable connector module.

22. The field-interchangeable fixed mount industrial scanner of claim 14, wherein the at least one connector module interface is the only interface between the I/O interface and the image capture assembly.

23. The field-interchangeable fixed mount industrial scanner of claim 14, wherein the first removable connector module includes a connector for a data storage medium, the data storage medium comprising at least one of a USB thumb drive, or a SD card.

24. A field-interchangeable fixed mount industrial scanner configured to be fixedly mounted in a manufacturing assembly, the field-interchangeable fixed mount industrial scanner comprising:

a housing carrying an image capture assembly and including a mounting mechanism and a coupling mechanism to removably receive at least one of: 1) a first removable connector module including at least one connector module interface and an input/output (I/O) interface having a first configuration; or 2) a second removable connector module including an I/O interface having a second configuration that is different from the I/O interface of the first removable connector module;

wherein the image capture assembly is disposed in a substantially enclosed first compartment of the housing removed from the coupling mechanism in a second compartment of the housing, where the first compartment is hermetically sealed from the second compartment, wherein the first removable connector module is adapted to be removed without disrupting the first compartment of the housing.

25. The field-interchangeable fixed mount industrial scanner of claim 24, wherein the I/O interface comprises at least one of a power transmission interface, a data transmission interface, or a combined power and data transmission interface.

26. The field-interchangeable fixed mount industrial scanner of claim 24, wherein the first removable connector module or the second removable connector module couples with the coupling mechanism of the housing via at least one of a friction fit engagement, a snap-in engagement, a magnetic engagement, or a fastener engagement.

27. The field-interchangeable fixed mount industrial scanner of claim 24, wherein at least one of the first removable connector module or the second removable connector module may be decoupled from the coupling mechanism of the housing without disassembly of any portion of the field-interchangeable fixed mount industrial scanner not associated with the first or the second removable connector module.

\* \* \* \* \*